(12) United States Patent  (10) Patent No.: US 9,251,210 B2
Chaudhry et al.  (45) Date of Patent: Feb. 2, 2016

(54) CACHING EXTERNAL DATA SOURCES FOR SQL PROCESSING

(71) Applicant: Oracle International Corporation, Redwood Shores, CA (US)

(72) Inventors: Atif Chaudhry, Pleasanton, CA (US); Chandrasekharan Iyer, Redwood City, CA (US)

(73) Assignee: Oracle International Corporation, Redwood Shore, CA (US)

( * ) Notice: Subject to any disclaimer, the term of this patent is extended or adjusted under 35 U.S.C. 154(b) by 319 days.

(21) Appl. No.: 13/866,866

(22) Filed: Apr. 19, 2013

(65) Prior Publication Data

US 2014/0317084 A1    Oct. 23, 2014

(51) Int. Cl.
    G06F 17/30    (2006.01)
(52) U.S. Cl.
    CPC ...... *G06F 17/30457* (2013.01); *G06F 17/3048* (2013.01)
(58) Field of Classification Search
    None
    See application file for complete search history.

(56) References Cited

U.S. PATENT DOCUMENTS

| | | | | |
|---|---|---|---|---|
| 8,543,554 | B1 * | 9/2013 | Singh et al. | 707/690 |
| 2003/0065826 | A1 * | 4/2003 | Skufca et al. | 709/315 |
| 2006/0026154 | A1 * | 2/2006 | Altinel et al. | 707/5 |
| 2007/0239791 | A1 * | 10/2007 | Cattell et al. | 707/200 |
| 2009/0049013 | A1 * | 2/2009 | Kumbi et al. | 711/118 |
| 2011/0314047 | A1 | 12/2011 | Koronthaly et al. | |
| 2012/0219023 | A1 * | 8/2012 | Cahill et al. | 372/20 |
| 2014/0201478 | A1 * | 7/2014 | Gunda et al. | 711/159 |
| 2014/0222777 | A1 * | 8/2014 | Creamer et al. | 707/713 |

OTHER PUBLICATIONS

Xiaoxia Huang, "Design and Implementation of a Cache-based Granular Computing System" ISKE 2007, Proceedings, dated Oct. 15, 2007, 6 pages.

Harder, Theo, "DBMS Architecture—New Challenges Ahead", Datebank-Specktum, Ohsu Digital Commons, dated Jan. 1, 2005, 12 pages.

* cited by examiner

*Primary Examiner* — Yuk Ting Choi
(74) *Attorney, Agent, or Firm* — Hickman Palermo Becker Bingham LLP (57) ABSTRACT

Techniques are provided for caching external data sources for SQL processing. According to an embodiment, a database system receives a query that requires foreign data from an external data source. In response to receiving the query, the database system determines whether the foreign data currently resides in a cache of the database system. In response to determining that the foreign does not currently reside in the cache, the database system retrieves the foreign data from the external data source, maps the foreign data to a column granule of a table, and stores the column granule in the cache. In another embodiment, the database system receives a second query that requires the foreign data. In response to determining that the foreign data is cached with the stored column granule, the database system retrieves the column granule from the cache.

20 Claims, 4 Drawing Sheets

CACHING EXTERNAL DATA SOURCES FOR SQL PROCESSING

FIELD OF THE INVENTION

The present disclosure relates generally to techniques for evaluating database queries and, more specifically, to techniques for caching external data sources for query processing.

BACKGROUND

A database is a structured collection of data and metadata that is stored on one or more storage devices, such as a set of hard disks. The data within a database may be logically organized according to a variety of data models, depending on the implementation. For example, in the relational model, data is typically organized into a set of tables, where each table comprises a set of row and columns. In most cases, each row represents a distinct object and each column represents a distinct attribute. However, other data models may also be used to organize the data.

A database management system (DBMS) is software that controls access to data in a database. The DBMS is configured to receive and process a variety of database commands, often referred to as queries. In many implementations, the DBMS supports queries that conform to a structured query language (SQL). SQL is a standardized query language for managing data in a relational DBMS (RDBMS).

SQL includes two distinct sets of commands: Data Definition Language (DDL) for managing and indexing data structures in the database; and Data Manipulation Language (DML) for accessing and manipulating data residing within the data structures. DDL is typically used to create, alter, and delete database objects, such as tables, indexes, views, and constraints, whereas DML is typically used to add, query, update, and delete data in existing database objects.

When the DBMS receives a query, such as a SQL expression, the DBMS evaluates the query to obtain a query result. Query evaluation includes two stages: query compilation and query execution. During query compilation, the DBMS parses the SQL expression and generates a query execution plan. The query execution plan specifies an ordered set of steps, frequently represented as a tree of query operators, used to execute the query. The query operators at each step are associated with one or more expressions that represent computations or other actions that will be performed upon query execution. Example SQL operators include, without limitation, table scans, joins, table queues, group-by operations, and bloom filters. Once the query execution plan is generated, the query is executed according to the plan.

In order to evaluate a SQL expression, the DBMS relies upon the internal structures and organization of the data within the database. For example, the SQL expression may identify which data to access from the database based on where it resides in a particular table. Data that resides externally (herein referred to as "foreign data") from the database is typically not constrained by the structure and organization defined by the internal database metadata. For instance, the foreign data may not be organized into a tabular format by the external data source and may be organized according to a different structure and format defined by the external data source. Therefore, SQL queries typically cannot be used to access and modify data external to the database.

One approach to enable SQL queries to analyze data residing outside the database involves loading the foreign data into the database. A database loader is an application that extracts data from the external source, transforms the extracted data into a format suitable for loading into a target database table, and populates the database table with the extracted data. Thus, data from the external source is internalized by the database and converted to a format that conforms to database's internal organization. This approach allows the DBMS to execute queries on data from external data sources after the data has been loaded into the database. However, the loading process involves a high processing and storage overhead, especially where the external source comprises large quantities of data that are continuously updated.

Another approach for evaluating foreign data is to offload query evaluation to an external source of the foreign data. For example, when a database query directed to foreign data is received, the DBMS may send the database query to the external source for evaluation. The external source may then evaluate the query and return the query result to the DBMS. This approach increases the processing overhead on the external data source and requires the external data source to be able to process queries received from the DBMS.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments are illustrated by way of example, and not by way of limitation, in the figures of the accompanying drawings and in which like reference numerals refer to similar elements and in which.

DETAILED DESCRIPTION

Techniques are described herein for caching foreign data for SQL processing. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to embodiments described herein, a database system is configured to cache foreign data on demand without loading the foreign data into persistent storage of a database. The cache of foreign data is herein referred to as an "external data cache." By caching such data, SQL analytics and other data analysis may be performed on the foreign data without repeatedly extracting the most commonly used foreign data from external sources. At the same time, the database is not overloaded with potentially extraneous foreign data since the data is only cached and not persisted in the database. Accordingly, query processing speeds on foreign data may be increased without increasing the storage overhead of the database. Furthermore, query evaluation may be completely internalized by the database system without offloading computation onto an external source of the foreign data.

In an embodiment, the DBMS may cache the foreign data in a format that is internal to the database system even though the external database that originated the foreign data may store the data in a different format. For example, the foreign data may reside in an arbitrary data file in the external data source. When a query is received, the appropriate data may be mapped from the data file to one or more database objects defined by the database system. The format may correspond to the internal structures and organization of the database to facilitate query evaluation using the foreign data. When subsequent queries that access the foreign data are received, the DBMS may access the cached foreign data without having to reextract the data from the external source or reformat the data to conform to the database's internal organization.

In an embodiment, the DBMS manages the external data cache according to one or more cache management policies. For example, the DBMS may purge foreign data that has become cold from the cache. The DBMS may also invalidate foreign data that has become stale.

In another embodiment, the external data cache is distributed across a plurality of nodes, and the DBMS may distribute the foreign data across the different nodes. When a query is received that accesses the foreign data, the plurality of nodes may be used to execute the query in parallel.

System Overview

Figure 1:
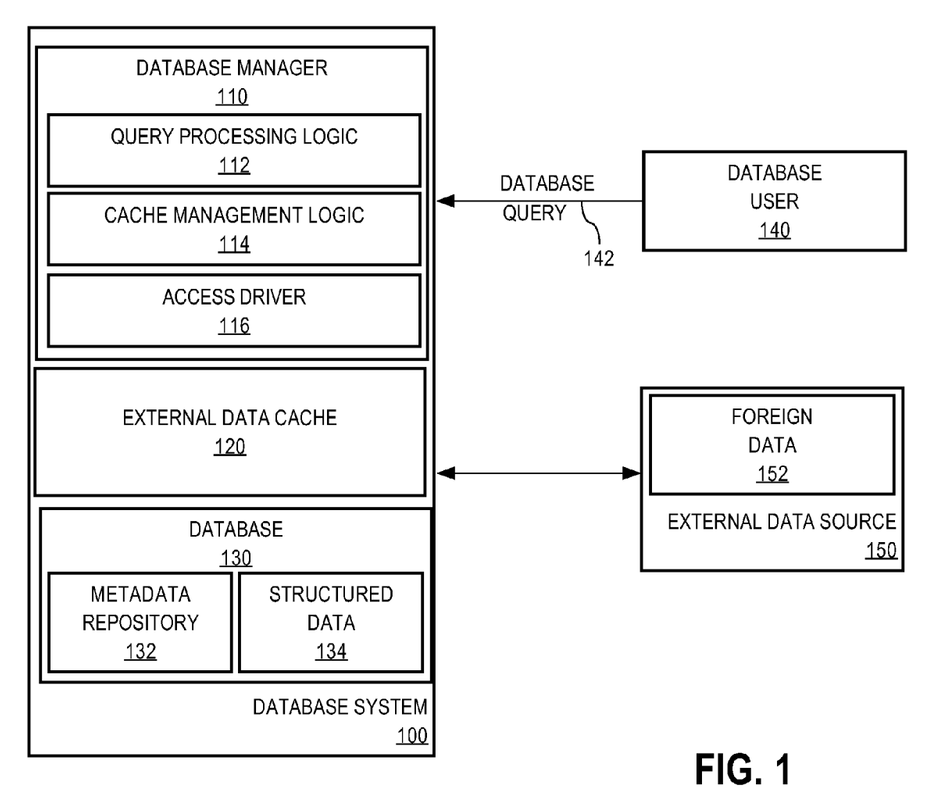
FIG. 1 is a block diagram depicting an example system architecture for processing external data sources, according to an embodiment.

FIG. 1 is a block diagram depicting an example system architecture, according to an embodiment. Database system 100 generally comprises database manager 110, external data cache 120, and database 130. Database manager 110 is a DBMS including one or more database servers and controls access to internal data stored in database 130, including metadata repository 132 and structured data 134. Database manager 110 may be distributed across a plurality of computing systems, or on a single computer, depending on the implementation. Database manager 110 comprises database query processing logic 112, invalidation logic 114, and access driver 116. Database system 100, including database manager 110, external data cache 120, and database 130, may comprise other elements, which are not illustrated for purposes of brevity.

Query processing logic 112 comprises logic for compiling and executing database queries 142 submitted by database user(s) 140. Database user(s) 140 may be any person, application, or other mechanism capable of submitting database queries 142 to database system 100. Query processing logic 112 may process and execute SQL queries directed to data residing external to database 130, such as foreign data 152, SQL queries directed to data internal to database 130, such as structured data 134, or SQL queries directed to any combination thereof. Query processing logic 112 may include, without limitation, a language engine for extracting database operations from the query expressions and generating a query execution plan, a query optimizer for optimizing the query execution plan, and a database engine for performing the database operations of the optimized query execution plan on the appropriate database objects.

External data cache 120 is a memory cache used by database manager 110 to store foreign data extracted from external data sources. External data cache may reside in system memory on a single database node or may be distributed across a plurality of database nodes. A database node may comprise any host machine executing a database server for an instance of database manager 110. Database system 100 may comprise other data caches that are not illustrated for purposes of brevity. Examples include, without limitation, a metadata (or data dictionary) cache, a buffer cache, a result cache, and a library cache. In an embodiment, external data cache 120 is part of the database result cache, as described in further detail below. The memory for external data cache may be allocated when a database instance is started and deallocated when the database instance terminates. External data cache 120 may be shared by multiple processes that belong to a single database instance. If external data cache 120 has no more available space for caching foreign data, some of the foreign data may be moved to disk, as described in further detail below.

Access driver 116 is an application programming interface (API) that interprets foreign data 152 for database system 100. When one of database queries 142 requests access to foreign data, database manager 110 may use access driver 116 to read and format foreign data 152 from external data source 150. In an embodiment, access driver 116 performs the transformations on foreign data 152 so that it matches the internal structures and organization of database system 100.

Cache management logic 114 manages external data cache 120 according to one or more cache replacement policies. For example, cache management logic 114 may purge the least recently used foreign data object from external data cache 120 to generate space for incoming foreign data. Cache management logic 114 may also invalidate foreign data when it has become stale. Techniques for invalidating foreign data are described in further detail below.

Foreign data 152 may comprise any data that resides externally to database 130. In an embodiment, foreign data 152 is managed by one or more external data source(s) 150 and is not subject to the same constraints imposed by database system 100 on data residing in database 130. For example, the structure and manner in which foreign data 152 is generated, updated, and stored by external data source(s) 150 may be different than the manner in which database manager 110 manages structured data 134. Examples of external data sources include, without limitation, internet feeds, flat files, remote tables accessed via a database-link, data generated by program functions, and other data files managed by separate applications outside the control of the DBMS.

Database 130 is non-volatile memory, such as disk, that persistently stores metadata in metadata repository 132 and structured data in structured data repository 134. In an embodiment, metadata stored in metadata repository 132 includes a data dictionary that defines database objects in structured data repository 134. For example, the metadata may identify table segments such as tables, partitions, and subpartitions stored in the structured data. Structured data repository 134 may store data according to one or more data models, including, without limitation, a relational data model. Other data models may also be used, depending on the particular implementation.

On-Demand Formatting and Caching of External Data

In an embodiment, database manager 110 performs on-demand formatting and caching of external data. For example, when access is first requested to target foreign data, database manager 110 extracts the target foreign data from the external data source, formats the target foreign data, and stores the data in external data cache 120.

In order to determine how to format the foreign data, database manager 110 may maintain mapping data that define how the foreign data maps to internal structures of database system 100.

In an embodiment, database manager maintains external table mapping data. An external table, as used herein, is a table whose structure is defined in database 130 and/or in a database query, but whose data is stored outside database 130. For example, an external table may be created, and its structure defined, through DDL statements such as the CREATE . . . ORGANIZATION EXTERNAL statement. In another example, the external table may be created through programmatic functions, such as PL/SQL statements or other table functions. The table functions may comprise any function that takes foreign data sources as input and produces a collection of rows and/or columns that can be queried Creating an external table does not create an actual table in database 130. That is, no foreign data is loaded and persisted in database 130 when a request to create an external table is received. In some embodiments, creating the external table may cause a table definition to be stored in database 130. For example, when an external table is first created, database 130 may store external table metadata, which describes how the external table layer presents data to the database system. The metadata may define the number and type of columns in the external table and how external data maps to the columns of the external table. In other embodiments, the external table may be linked to the external data source through a script or other programmatic function, or through a database link to a remote table. Accordingly, the structure of the table is defined; however, no data is loaded into the table in database 130.

In an embodiment, when foreign data is loaded into external data cache 120, access driver 116 uses mapping data maintained by database manager 110 to convert the foreign data from a format native to the external data source to a format (herein referred to as a "target format") that conforms to the internal structures and organization of database system 100. For example, each separate line of a file in external data source 150 may be mapped to a different table row as defined by external table metadata. In another embodiment, foreign data included in external files may map to certain columns based on the date that the data was generated. The foreign data may be mapped in any other suitable manner.

In an embodiment, the external data cache 120 stores the foreign data in the target format for use in query processing. The target format may vary from implementation to implementation. For example, the foreign data may be loaded into a set of one or more columns of a table. The columns may be stored in column-major format, row-major format, or some combination thereof. The foreign data may also be compressed and/or encoded differently than the foreign system.

Processing Queries that Access Foreign Data

Figure 2:
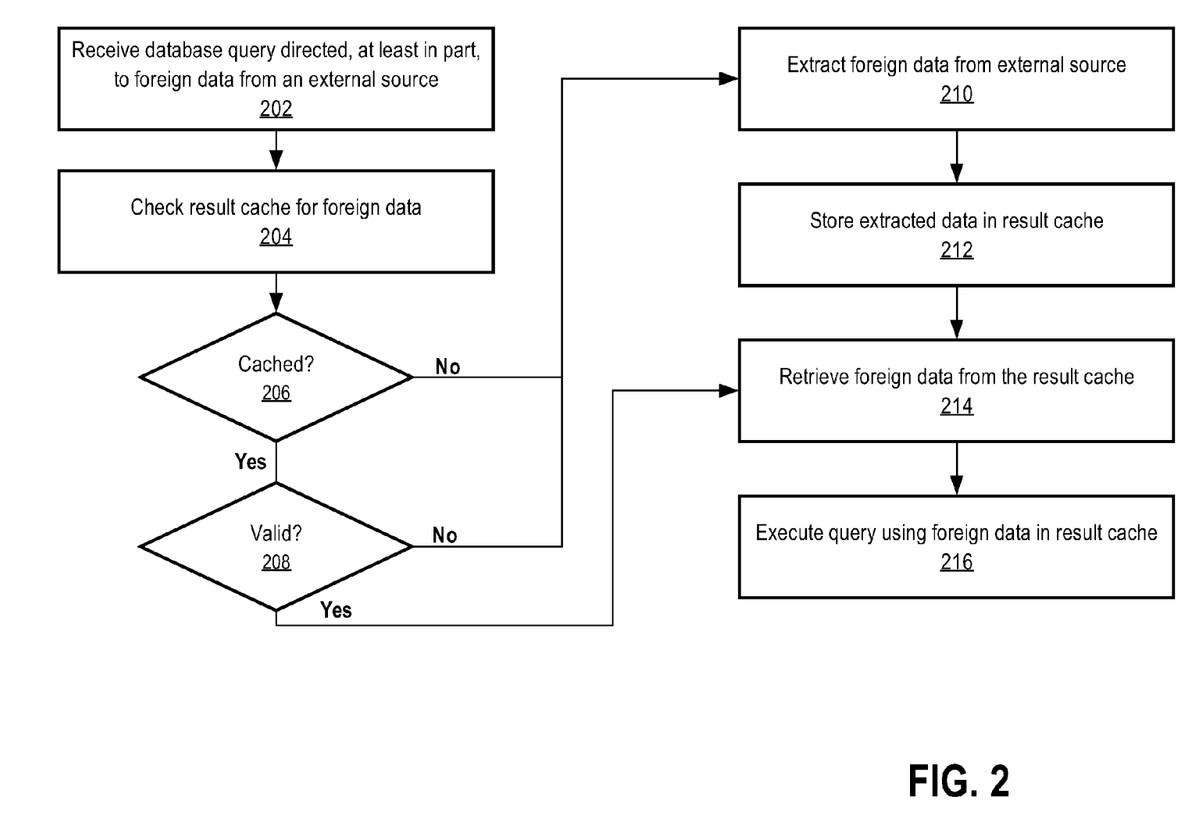
FIG. 2 is a flowchart illustrating a process for evaluating queries that access foreign data, according to an embodiment.

FIG. 2 is a flowchart illustrating a process for evaluating queries that access foreign data, according to an embodiment. In step 202, database manager 110 receives a database query that is directed, at least in part to data residing in an external source. In an example embodiment, the database query references a column of an external table. As noted above, data for external table does not reside in the database; rather the external table comprises metadata that defines a mapping from the foreign data to the external table columns. In other embodiments, the database query may reference the external data through a PL/SQL table function or other type of function that maps foreign data to internal database objects. In another embodiment, the database query may reference the external data through a database link to a remote table.

In step 204, database manager 110 processes the query and checks external data cache 120 for foreign data required by the query. In an embodiment, database manager 110 uses query processing logic 112 to parse the query and identify query expressions referencing the external data sources and to generate a query execution plan. Techniques for generating a query execution plan are described in further detail below.

In step 206, database manager 110 determines whether the foreign data required by the received query currently reside in external data cache 120. For example, database manager 110 may query external data cache 120 for a particular external table column referenced by the query. If the foreign data does not reside in the cache then the process continues to step 210. On the other hand, if the cache has the foreign data, then the process continues to step 208. In some instances part of the foreign data required by the query may be cached in external data cache 120 while other parts may not have been previously cached or may have been deleted. In such instances, the process continues to step 208 for those parts that are cached and step 210 for those parts that are not cached.

In step 208, database manager 110 determines whether the cached data is valid. If invalidation logic 114 has determined the foreign data is stale or otherwise invalid, then the process continues to step 210. On the other hand, if the cached data is valid, then the process continues to step 214. In some instances part of the cached data may be valid while another part may be invalid. In such instances, the process continues to step 210 for those parts that are invalid, and 214 for those parts that are valid. In an embodiment, step 208 involves invalidation logic 114 querying external data source(s) 150 through access driver 116 whether the foreign data is still valid. In other embodiments, the external data source(s) 150 may proactively notify invalidation logic 114 when cached foreign data has become invalid. In such cases, invalidation logic 114 may delete the cached data whenever the external data source sends an invalidation request, and step 208 may be omitted as foreign data only resides in external data cache 120 if valid.

In step 210, database manager 110 extracts the foreign data required by the query from the external data source. In an embodiment, access driver 116 determines, from external table metadata and the external columns referenced in the database query, which foreign data to extract from the external data source. Access driver 116 retrieves this foreign data from the external data source and maps the foreign data to columns and/or column granules of the external table.

In step 212, database manager 110 stores the foreign data in external data cache 120 in a format that facilitates query processing. For example, the foreign data may be stored in column format, where each row of the column is stored contiguously in memory. The foreign data may be stored in column format even though stored in a different format by external data source(s) 150. In another embodiment, the foreign data is loaded into the cache without storing the data in persistent storage in database 130.

In step 214, database manager 110 retrieves the foreign data from external data cache 120 during query execution, and in step 216, database manager 110 executes the query using the foreign data to generate a query result. Database manager 110 may combine the foreign data with internal data to generate the query result. For example, structured data 134 may store information about various individuals for whom genomic data has been generated while the actual genomic data resides in external files. Database manager 110 may extract certain parts of the genomic data based on the received database query and combine this foreign data with selected information for the respective individual to whom the genomic data pertains. Once generated, the query result may be stored in external data cache 120 and/or database 130. Thus, the query result may be stored in persistent storage within the database system even though the foreign data used to generate the query result may only reside in a memory cache.

Caching Column Granules and Parallel Query

In an embodiment, external data cache 120 caches column granules of the external table. A column granule may comprise any range of rows of a column. For example, the column granule may store a set of rows for a column of a table partition or for a rowid range granule. Thus, a column granule may be the entire column or a portion of the entire column requested by the query. The column granule may even comprise a single row of the external table column.

In an embodiment, the column granules are generated by a parallelization process. The parallelization process breaks an external table column into multiple parts for parallel execution so that query execution can be performed on different processors in a multi-processor database system. The manner in which the column granules are formed may vary depending on the implementation. For example, each column granule may correspond to a different offset in an external file.

As noted above, database manager 110 may be distributed across a plurality of database node. Each of the database nodes may comprise a different computing device executing a database server with its own external data cache that stores a different portion of the column (i.e., a different column granule). Columns that reside on different database nodes are herein referred to as parallel query ("PQ') column granules. Each cached PQ granule may be managed independently from other granules of the same column. For example, eviction of a column granule from the external data cache of one database server does not affect the eviction of a different column granule of the same column stored in the external data cache of a different or the same database server.

Caching External Data in a Result Cache

In an embodiment external data cache 120 may be part of a result cache that database system 100 uses to store query results for re-use in subsequent executions. For example, the first time a query is received, data blocks used by the query are read from database 130 and loaded into a buffer cache if they do not already reside in the buffer cache. The DBMS executes the query to generate a query result, which is stored in a result cache. The result data stored in the result cache may comprise result data for particular operations performed while executing the query, such as the result of a table scan or table join, and/or may comprise the entire final result of executing the query. In contrast to the buffer cache or a cache of data blocks, the result cache does not cache entire data blocks as they are read from the database, but rather result set data for individual queries. When the same query is received again by the DBMS, the query result may be retrieved from the result cache without reaccessing the data blocks, from either the buffer cache or database, that are required by the query. According to techniques described further herein, external data cache 120 may be part of a result cache that also caches foreign data loaded from external data sources. The foreign data may be treated as result data in the result cache even though the foreign data may not be the final result of an executed query but rather data required to obtain the final result.

Sharing Foreign Data Across Queries

Figure 3:
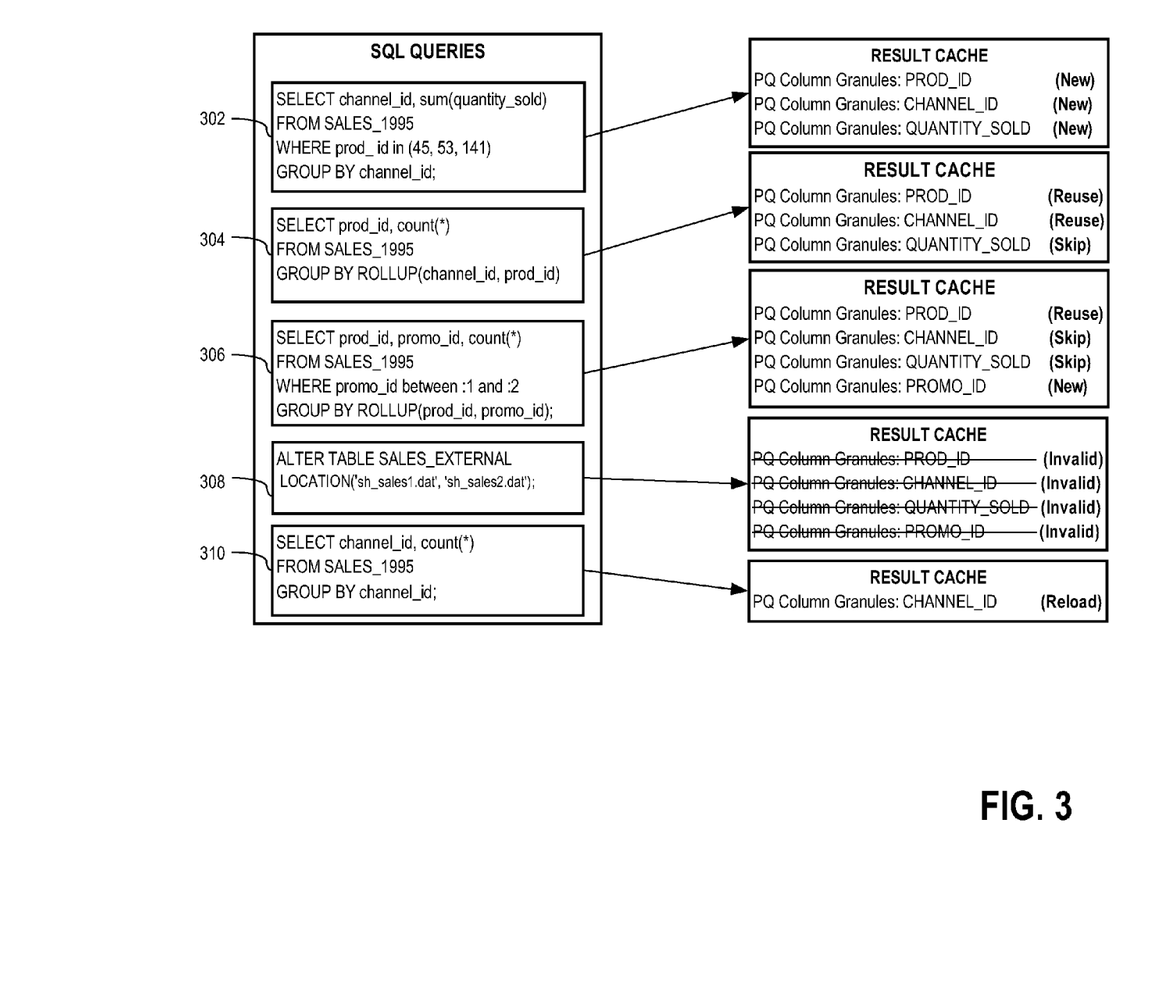
FIG. 3 is a chart illustrating example database queries and the resulting state of the result cache, according to an embodiment.

Foreign data residing in external data cache 120 can be shared across different database queries to minimize redundant caching. FIG. 3 is a chart illustrating example database queries and the resulting state of a result cache, according to an embodiment. Although a result cache is illustrated in this embodiment, other memory caches may also be used, depending on the implementation.

Queries 302 to 310 represent different SQL queries received by database manager 110. Each of these queries points to a state of the result cache caused when the respective query is processed.

In an initial state, the result cache is empty. Database manager 110 receives query 302, which references various columns of the external table SALES_1995. These columns include the PROD_ID column, the CHANNEL_ID column, and the QUANTITY_SOLD column. These columns do not initially reside in external data cache 120, as the result cache is empty. Accordingly, database manager 110 extracts the foreign data from an external source and maps the foreign data to the appropriate column granules. PQ column granules are then added to the result cache for each of the PROD_ID, CHANNEL_ID, and QUANTITY_SOLD columns. Database manager 110 uses the foreign data stored in the result cache to evaluate query 302 and generate the query result.

Database manager 110 subsequently receives query 304, which references the PROD_ID and the CHANNEL_ID columns. Database manager 110 does not need to extract these columns again, as they already reside in result cache. Database manager 110 reuses the cached data for the PROD_ID and CHANNEL_ID columns to evaluate query 304 and generate the query result. Accordingly, these columns are shared by query 302 and query 304, even though these queries use these columns to generate different results. The QUANTITY_SOLD column is not needed by query 304. However, this column continues to reside in external data cache 120 as long as there is sufficient storage space.

Query 306 references the PROD_ID and PROMO_ID columns of the external table SALES_1995. The PQ PROD_ID column granule is reused, but the PROMO_ID column has not been previously extracted from the external data source. Therefore, database manager 110 extracts the foreign data, loads the foreign data into the PQ PROMO_ID column granule, and stores this column granule in external data cache 120. The PQ CHANNEL_ID and PQ QUANTITY SOLD column granules also continue to reside in external data cache 120, but are not used in processing query 306.

SQL STATEMENT 308 alters the location of the external source for the external table SALES_1995. Therefore, the PQ column granules that currently reside in external data cache 120 for the external table SALES_1995 are invalidated and removed from the cache. Database manager 110 subsequently receives query 310, which references the CHANNEL_ID column. Because this column has been invalidated, the foreign data for this column is extracted again from the external data source and the column is reloaded into external data cache 120.

Generating a Query Execution Plan for Caching External Data

In an embodiment, query processing logic generates a query execution plan by adding a cache operator for every external table scan in the query execution plan. The cache operator checks for available external table columns in external data cache 120 before performing the external table scan. If all external table columns needed are in the cache, then the external table scan operation is skipped. Otherwise, the external table scan operation is performed to extract the foreign data for the missing columns. The cache operator then causes these missing columns to be cached in external data cache 120.

In an embodiment, the cache operator and the table scan operator are row-sources, and the underlying table scan row-source fetches rows from the external data source in rowid order. This ensures that separately loaded columns have the same row ordering. The rowid order may be determined from the external table metadata, as the external data source may not structure the foreign data into row format.

Controlling Result Caching of Foreign Data

In an embodiment, caching of foreign data may be enabled and disabled by a database user, such as a database administrator. Control may be specified on a per-external table basis or for particular views of an external table. Accordingly, result caching may be enabled for only specific foreign data files and disabled for other data files in the same external data source. Similarly, result caching may be enabled for some external data sources and disabled for others.

In an embodiment, the database user enables result caching by (indirectly) annotating the external table. In order to annotate the external table, the database user may use a RESULT_CACHE database hint in DDL statements accessing external tables. Example statements include the CREATE and ALTER VIEW statements. Database manager 110 determines whether an external table is annotated before performing the result caching process described above. When the annotations indicate that result caching is enabled, database manager 110 caches the foreign data and enables the cached data to be shared across different database queries.

Table 1 below illustrates database statements may be used to enable result caching for a particular table view that accesses the external table SALES_EXTERNAL:

TABLE 1

ANNOTATED VIEW

CREATE TABLE SALES_EXTERNAL
  (PROD_ID NUMBER,
  CUST_ID NUMBER,
  TIME_ID DATE,
  QUANTITY_SOLD NUMBER,
  AMOUNT_SOLD NUMBER)
ORGANIZATION EXTERNAL
(TYPE ORACLE_LOADER
  LOCATION ('sh_ sales1.dat')) ;
CREATE VIEW SALES_1995 AS
  SELECT /*+ RESULT CACHE */ *
  FROM SALES_EXTERNAL
  WHERE TIME_ID BETWEEN '1-JAN-1995' AND 31-DEC-1995;

As shown above, the view defines a horizontal slice of an external data source based on a time range. The database hint "RESULT_CACHE" annotates the view for result caching. An annotated view uses the result cache to initially store and then subsequently access the columns of the table, partition, or rowid range granule defined by the view. Data that does not belong to an annotated external table, such as data outside the time range defined by the annotated view of Table 1, is not cached in the result cache and/or not shared across different database queries.

The cached columns (or column granules) can be managed by DBAs like any other result cache object. DBAs may track the cached columns and column granules using a view which will name each cached column unambiguously. Additionally, all the cached columns may be stored in a separate namespace. In another embodiment, DBAs may directly select the contents of a cached column or other result cache object.

Loading Column Granules into the External Data Cache

In an embodiment, columns are cached on-demand and independent of other columns in the table. For example, the PROD_ID, CHANNEL_ID column, and QUANTITY_SOLD columns are loaded into external data cache 120 as demanded by query 302 and are loaded independently of other columns in the SALES_1995 table. Thus, foreign data for other columns, such as the PROMO_ID column, is not loaded into external data cache 120 in response to query 302.

In another embodiment a plurality of database servers load the foreign data for the same external table in parallel. When loading the table in parallel, a server process waits for a column that it needs when another server process is loading it, but does not wait if all the columns it needs are present and another server process is loading some other column of that external table.

Encoding

In an embodiment, columns with few distinct values relative to the number of rows are stored in an encoded form in external data cache 120. For these encoded columns, the unique bit patterns are kept in a symbol table followed by a vector of indexes into that table. Encoding such columns reduces memory usage and allows for a greater number of objects to be cached, which may improve performance. Encoding may also allow opportunities for more efficient query execution.

The encoding algorithm used may vary from implementation to implementation In an embodiment, the encoding algorithm used provides in-place decoding. This allows the column buffer pointers to directly point into the stored values. In another embodiment, the encoding algorithm used to store encoded data in external data cache 120 differs from the encoding algorithm used, if any, of the foreign system that originated the data.

Caching Statistics

In an embodiment, the external data cache also caches statistics on the external table columns. The statistics may be determined by database manager 110 as the foreign data is extracted from the external data source and mapped to the appropriate column granules.

For example, database manager 110 may count the total number of rows of an external table column as the foreign data are mapped to rows in the external table column. External data cache 120 may store these statistics, which may be accessed through a COUNT(*) query expression. When a query requests such statistics, the statistics do not need to be recomputed by reanalyzing the relevant column granules. Rather, the result may be directly retrieved from external data cache 120.

In another example, external data cache 120 may store min/max statistics. The min/max statistics identify the minimum and maximum values within a column granule. These statistics may make it possible, for certain queries, to obviate scanning the column granule altogether.

Predicate Evaluation

In an embodiment, predicates on the external tables are pushed into the external data cache service, which in turn uses the cached predicates for efficient access where possible. For example, "CUST IN ('CORP A', 'CORP B', 'CORP C')" may be processed by converting the values into integers (by looking them up in the per column symbol table) and then scanning the fixed width column vector for the given integers.

Invalidating External Data in the Cache

Because database manager 110 does not manage foreign data 152, foreign data 152 may be altered without permission from database manager 110. When foreign data 152 is altered, the cached data in external data cache 120 may no longer be valid. In order to ensure data in external data cache 120 is up-to-date, invalidation logic 114 determines when foreign data for a particular external table column granule changes, and invalidates the appropriate column granules from external data cache 120 when a change is detected. The manner in which changes are detected may vary from implementation to implementation.

In an embodiment, a column granule is invalidated when a transaction has modified the definition of the external table or the view using that external table. For example, invalidation logic 114 invalidates all PQ column granules for the external table SALES_1995 in response to receiving SQL statement 308.

In another embodiment, invalidation logic 114 performs a status checks on the external tables. For example, whenever query processing logic 112 requests a cached external table column granule from external data cache 120, invalidation logic 114 checks with external data source, through the APIs provided in access driver 116, whether the foreign data for that column granule has changed. If the foreign data has changed, then the column granule is invalidated and reloaded into the external data cache 120.

In another embodiment, the external data source comprises logic that notifies invalidation logic 114 whenever foreign data changes. Invalidation logic receives information about which foreign data has changed and determines which cached items in the external data cache should be invalidated.

In another embodiment, an expiration time is associated with external data cache objects. The expiration time specifies a time-to-live for each column granule cached in external data cache 120. When the time-to-live expires, the corresponding external table column is invalidated (i.e., marked as invalid or deleted from the cache).

In order to determine if foreign data has changed in an external data source, timestamps of the data file from which the foreign data may be compared. For example, invalidation logic 114 may store a timestamp of the file when the column granule is first cached. When a subsequent query uses the column granule or the external data source sends a status update, invalidation logic checks the timestamp of the underlying file to see if it has changed. If the timestamp is changed, then the column is invalidated and reextracted from the external data source.

If foreign data is added to external data source without changing the preexisting foreign data, invalidation logic 114 does not invalidate any column granules according to an embodiment. Rather, when a subsequent query is received, the additional data is extracted and loaded into the external table column. The column granules for the referenced column that have already been cached continue to reside in their respective external data cache(s).

Cache Eviction

As the external data cache does not have unlimited memory, cache items are evicted to free up space for incoming items. In an embodiment, each external table column granule is a cache object that moves up and down a least recently used (LRU) list independently with respect to other columns in that external table. The external table column granule that is least recently used is evicted from the cache and replaced with the most recently used column granule. Other cache eviction algorithms may also be used, depending on the implementation. Examples include, without limitation, evicting cached items based on which item is the least frequently used.

When multiple column granules are stored at different nodes in a distributed database system, certain column granules may become cold before other column granules in the same column. For example a first database server may evict a column granule of a particular external table from the first database server's external data cache while another database server maintains a column granule from the same external table in the second database server's external data cache.

In an embodiment, when a valid column granule is selected for eviction from external data cache 120, all of the memory blocks are released. The evicted column granule is not stored in database 130 and will therefore be extracted again from the external data source the next time it is required by a query.

In an alternative embodiment, the result is written to a swap file specified at database instance startup time. When the result is evicted, then external data cache release all but a first block or a header block from memory for that column granule. The header block stores a disk pointer corresponding to an offset in the swap file where the column granule was written. A subsequent request for that swapped out column granule causes it to be loaded into external data cache 120 using the disk pointer. Thus step 210 may comprise extracting the foreign data from the swap file instead of the external source when the foreign data is reloaded into the external data cache. To reduce the amount of input/output (IO) overhead, the column granule may be compressed before writing it to the swap file. The swap file may be used, not only for column granules, but also for all other cache objects, such as SQL and PL/SQL results. The swap file may be implemented as a swap table or may be written in any other format, depending on the implementation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
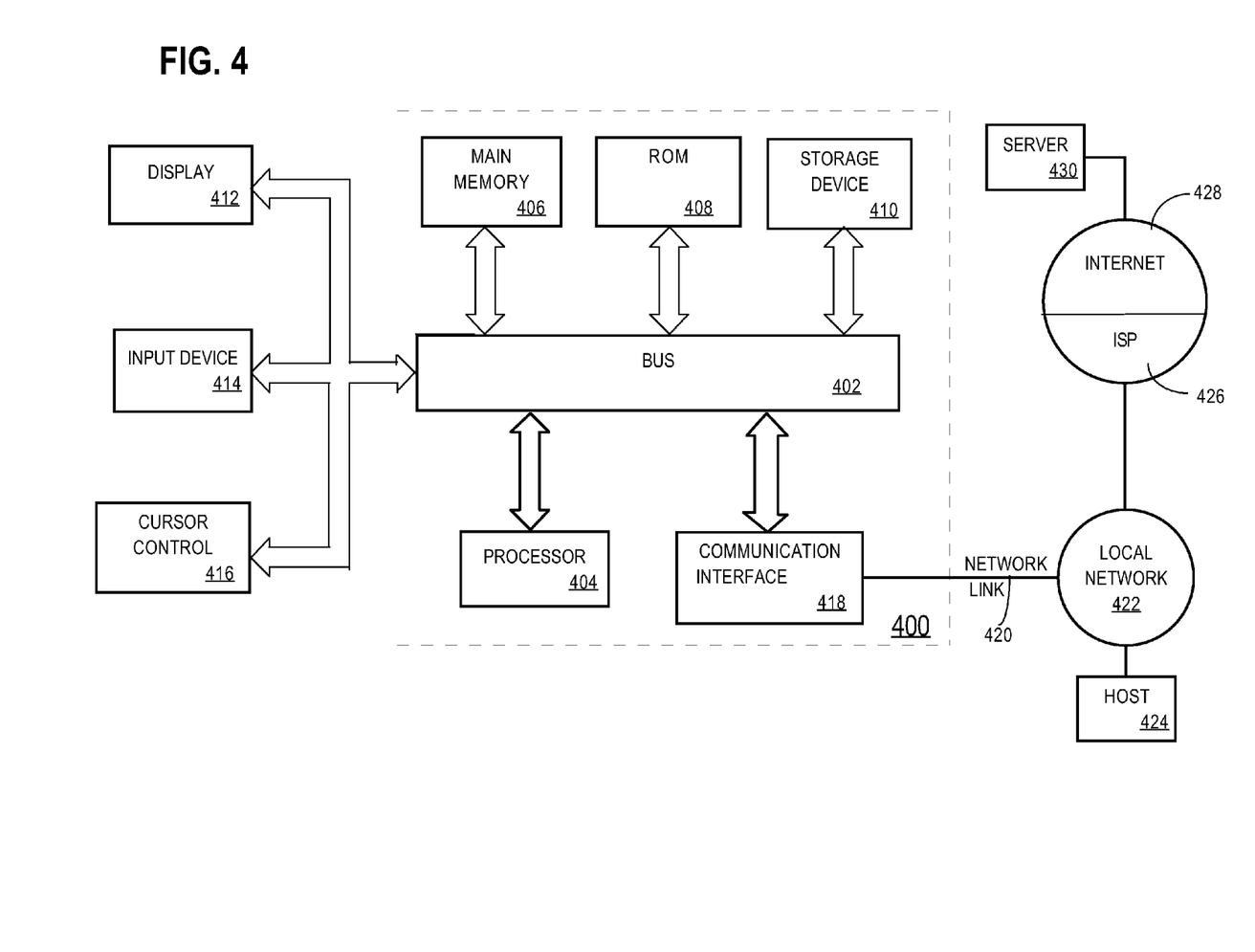
FIG. 4 is a block diagram depicting a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for optimizing query processing, the method comprising:
   storing, at a database system, metadata for an external table;
   wherein the metadata for the external table defines one or more columns for the external table and how data from an external data source maps to the one or more columns of the external table;
   receiving, at the database system, a query that requires foreign data from the external data source;
   in response to receiving the query, determining whether the foreign data currently resides in a cache of the database system;
   in response to determining that the foreign data does not currently reside in the cache: retrieving the foreign data from the external data source; wherein the external data source has a different structure and format than the database system and the foreign data is stored in a particular format and structure associated with the external data source;

mapping, based on the metadata for the external table, the foreign data from the particular format and structure associated with the external data source to a column granule of the external table; and storing the column granule in the cache.

2. The method of claim 1, wherein the query is a first query, the method further comprising:

receiving, at the database system, a second query that requires second foreign data from the external data source;

in response to receiving the second query, determining whether the second foreign data currently resides in the cache of the database system;

in response to determining that the second foreign data does not currently reside in the cache:
retrieving the foreign data from the external data source;
mapping the foreign data to a column granule of a table; and
storing the column granule in the cache.

3. The method of claim 1, wherein the column granule is an entire column referenced by the query.

4. The method of claim 1,
wherein the column granule is a first portion of a column referenced by the query, wherein the cache is a first result cache of a first database server;
wherein a second result cache of a second database server stores a second column granule;
wherein the second column granule is a second portion of the column referenced by the query.

5. The method of claim 1, wherein the query is a first query, the method further comprising:

receiving, at the database system, a second query that requires the foreign data from the external data source;
wherein the second query includes a different expression than the first query;
in response to receiving the second query, determining whether the foreign data currently resides in the cache of the database system;
in response to determining that the foreign data currently resides in the cache: retrieving, from the cache, the column granule populated with the foreign data currently residing in the cache.

6. The method of claim 1, wherein the query is a first query, the method further comprising:

receiving, at the database system, a second query that requires the foreign data from the external data source;
in response to receiving the second query, determining whether the foreign data currently resides in the cache of the database system;
querying the external data source to determine whether the foreign data is still valid;
in response to determining that the foreign data is no longer valid:
retrieving updated foreign data from the external data source;
mapping the updated foreign data to the column granule of the external table; and
storing the column granule with the updated foreign data in the cache.

7. The method of claim 1, further comprising:

receiving, at the database system, a notification from the external data source that the foreign data in the external data source has changed;
in response to receiving the notification, invalidating the column granule in the cache.

8. The method of claim 1, further comprising:
determining statistics associated with the foreign data;
storing, in the cache, the statistics associated with the foreign data.

9. The method of claim 1, further comprising:
evicting a second column granule of the external table from the cache;
wherein evicting the second column granule of the external table comprises:
deleting the second column granule from the cache;
generating a temporary file to store the second column granule;
storing a pointer to the temporary file in the cache.

10. The method of claim 1,
wherein the column granule is part of a view of the external table that has been annotated to enable caching of foreign data;
wherein a second column granule which does not belong to the view of the external table that has been annotated is not stored in the cache.

11. One or more non-transitory computer-readable media storing sequences of instructions, that when executed by one or more processors, cause:

storing, at a database system, metadata for an external table;
wherein the metadata for the external table defines one or more columns for the external table and how data from an external data source maps to the one or more columns of the external table;
receiving, at the database system, a query that requires foreign data from the external data source;
in response to receiving the query, determining whether the foreign data currently resides in a cache of the database system;
in response to determining that the foreign data does not currently reside in the cache: retrieving the foreign data from the external data source; wherein the external data source has a different structure and format than the database system and the foreign data is stored in a particular format and structure associated with the external data source;
mapping, based on the metadata for the external table, the foreign data from the particular format and structure associated with the external data source to a column granule of the external table; and
storing the column granule in the cache.

12. The non-transitory computer-readable media of claim 11, wherein the query is a first query, and the sequences of instructions include instructions that when executed by one or more processors, cause:

receiving, at the database system, a second query that requires second foreign data from the external data source;
in response to receiving the second query, determining whether the second foreign data currently resides in the cache of the database system;
in response to determining that the second foreign data does not currently reside in the cache:
retrieving the foreign data from the external data source;
mapping the foreign data to a column granule of a table; and
storing the column granule in the cache.

13. The non-transitory computer-readable media of claim 11, wherein the column granule is an entire column referenced by the query.

14. The non-transitory computer-readable media of claim 11,
wherein the column granule is a first portion of a column referenced by the query;
wherein the cache is a first result cache of a first database server;
wherein a second result cache of a second database server stores a second column granule;
wherein the second column granule is a second portion of the column referenced by the query.

15. The non-transitory computer-readable media of claim 11, wherein the query is a first query, and the sequences of instructions include instructions, that when executed by one or more processors, cause:
receiving, at the database system, a second query that requires the foreign data from the external data source;
wherein the second query includes a different expression than the first query;
in response to receiving the second query, determining whether the foreign data currently resides in the cache of the database system;
in response to determining that the foreign data currently resides in the cache: retrieving, from the cache, the column granule currently residing in the cache.

16. The non-transitory computer-readable media of claim 11, wherein the query is a first query, and the sequences of instructions include instructions, that when executed by one or more processors, cause:
receiving, at the database system, a second query that requires the foreign data from the external data source;
in response to receiving the second query, determining whether the foreign data currently resides in the cache of the database system;
querying the external data source to determine whether the foreign data is still valid;
in response to determining that the foreign data is no longer valid:
retrieving updated foreign data from the external data source;
mapping the updated foreign data to the column granule of the external table; and
storing the column granule populated with the updated foreign data in the cache.

17. The non-transitory computer-readable media of claim 11,
wherein the sequences of instructions include instructions, that when executed by one or more processors, cause:
receiving, at the database system, a notification from the external data source that the foreign data in the external data source has changed;
in response to receiving the notification, invalidating the column granule in the cache.

18. The non-transitory computer-readable media of claim 11,
wherein the sequences of instructions include instructions, that when executed by one or more processors, cause:
determining statistics associated with the foreign data;
storing, in the cache, the statistics associated with the foreign data.

19. The non-transitory computer-readable media of claim 11, wherein
the sequences of instructions include instructions, that when executed by one or more processors, cause:
evicting a second column granule of the external table from the cache;
wherein evicting the second column granule of the external table comprises:
deleting the second column granule from the cache;
generating a temporary file to store the second column granule;
storing a pointer to the temporary file in the cache.

20. The non-transitory computer-readable media of claim 11,
wherein the column granule is part of a view of the external table that has been annotated to enable caching of foreign data;
wherein a second column granule for which does not belong to the view of the external table that has been annotated is not stored in the cache.

* * * * *